United States Patent
Li et al.

(10) Patent No.: US 6,944,360 B2
(45) Date of Patent: Sep. 13, 2005

(54) REMOTE TEMPERATURE/STRAIN FIBER OPTIC SENSING SYSTEM WITH EMBEDDED SENSOR

(75) Inventors: Xiaochun Li, Stanford, CA (US); Friedrich Prinz, Woodside, CA (US); Anastasios Golnas, San Francisco, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 10/768,270

(22) Filed: Jan. 29, 2004

(65) Prior Publication Data

US 2004/0184700 A1 Sep. 23, 2004

Related U.S. Application Data

(62) Division of application No. 09/597,966, filed on Jun. 20, 2000, now Pat. No. 6,876,785.
(60) Provisional application No. 60/187,240, filed on Mar. 3, 2000, and provisional application No. 60/142,348, filed on Jun. 30, 1999.

(51) Int. Cl.[7] ............................. G02B 6/00; G02B 6/44; G01J 5/08; G01K 11/32
(52) U.S. Cl. ...................... 385/12; 385/107; 385/128; 250/227.13; 250/227.18; 374/161
(58) Field of Search ..................... 250/227.14, 227.18, 250/227.19; 385/12, 13, 127, 128, 107; 374/161

(56) References Cited

U.S. PATENT DOCUMENTS

| | | | |
|---|---|---|---|
| 5,283,852 A | | 2/1994 | Gibler et al. ............... 385/136 |
| 5,361,130 A | * | 11/1994 | Kersey et al. .............. 356/478 |
| 5,675,674 A | * | 10/1997 | Weis ........................... 385/12 |
| 5,714,680 A | * | 2/1998 | Taylor et al. .................. 385/12 |
| 5,996,219 A | * | 12/1999 | Golnas et al. ............ 174/126.4 |
| 6,243,403 B1 | * | 6/2001 | Broutin et al. .............. 250/216 |
| 6,400,137 B1 | * | 6/2002 | Muzslay et al. ............. 385/81 |

* cited by examiner

*Primary Examiner*—Rodney Bovernick
*Assistant Examiner*—Omar Rojas
(74) *Attorney, Agent, or Firm*—Lumen Intellectual Property Services, Inc.

(57) ABSTRACT

A sensor embedded in a high temperature metal is incorporated into a sensing system for measuring temperature, strain, or other properties of a metal structure. An optical system transmits light to and receives output signals from the sensor for analysis. With rotating structures, an optical fiber lead transmits light between the sensor and external surface of the structure along its rotational axis, allowing the lead to remain fixed with respect to the optical system as the structure rotates at high speeds.

26 Claims, 5 Drawing Sheets

REMOTE TEMPERATURE/STRAIN FIBER OPTIC SENSING SYSTEM WITH EMBEDDED SENSOR

PRIORITY CLAIM TO RELATED APPLICATIONS

This Application is a Divisional Application of and claiming priority to U.S. Application titled "Embedded Sensor, Method For Producing, And Remote Temperature/Strain Fiber Optic Sensing System", Ser. No. 09/597,966 filed Jun. 20, 2000, now U.S. Pat. No. 6,876,785, which claims priority to Provisional Application 60/142,348 filed Jun. 30, 1999 and Provisional Application 60/187,240 filed Mar. 3, 2000.

STATEMENT REGARDING FEDERALLY SPONSORED RESEARCH OR DEVELOPMENT

This invention was supported in part by grant numbers 2DJ12 554 and N00014-96-0354-P00002 from the Office of Naval Research (ONR). The Government has certain rights in the invention.

FIELD OF THE INVENTION

This invention relates generally to embedded sensors. More particularly, it relates to sensors embedded in high melting temperature metals, a method for embedding the sensors, and a system incorporating the sensors.

BACKGROUND ART

The need to obtain information on the performance and remaining lifetime of a tool is of prime importance to many industries. Examples of applications include the manufacturing industry (molds, dies, drilling bits, etc.), the aerospace industry (components of jet engines), the oil industry (drilling equipment), the power industry (vessels and pipes). Such applications call for on-line acquisition of information such as temperature and strain values from tooling and structures. Temperature and strain information can only be obtained by placing sensors into those tools, and information from an extended area can only be obtained from arrays of such sensors. Such a solution calls for the placement of the sensors near the points of interest, and therefore the issues of assembly and protection need to be addressed. The assembly of a large number of sensors is cumbersome, time-consuming, and costly, and this endeavor might become difficult for tooling operating in harsh environments. Since the sensors are embedded into functional metallic structure, non-obtrusive embeddability is very important to maintain the integrity of the functional metallic structures. The sensors ought to be small in size and rugged inside the metal matrix. Thin film thermo-mechanical sensors and fiber optic sensors have been identified as two promising candidates.

Fiber optic sensors offer a series of advantages over conventional electronic sensors used to measure temperature, strain, ultrasonic pressure, and other properties. These advantages include small size, high sensitivity, immunity to electromagnetic interference, high temperature capability, multiplexing potential, and low cost.

The small size makes fiber optic sensors good candidates for embedding within structures. Embedded sensors measure parameters at locations not accessible to ordinary sensors, and allow for real-time measurements during fabrication and use of structures. They can also be used for non-contact measurements because they do not require wiring between the sensor and detector. In addition, embedded sensors are protected from damage and isolated from environmental effects to which the structure is subject. While embedding sensors in composite materials is a common process, no successful techniques have been developed for embedding sensors in metal structures with high melting temperatures. During metal casting, in which an enormous temperature change is suddenly applied to the sensor, the sensor undergoes extreme thermal stress and cracks. Silica-based fibers cannot withstand the processing of metals with melting temperatures above 1100° C.

Surviving processing is only one requirement of embedded sensors. Fiber sensors measure strain by measuring fiber displacement, which manifests in a change of a measured property of the light travelling through the fiber. The embedded fiber must, therefore, expand or contract with the metal during measurement, without slipping. There must also be good bonding between the fiber and metal. Without adequate bonding, the fiber slips at the interface during temperature- or stress-induced displacement, resulting in poor measurements.

A method for embedding fiber optic sensors in aluminum, which has a melting temperature of 660° C., has been disclosed by Lee et al., entitled "Method for Embedding Optical Fibers and Optical Fiber Sensors in Metal Parts and Structures" issued in Fiber Optics Smart Structures and Skins IV, SPIE, Vol. 1588, pp. 110–116 (1991). The fiber sensor is positioned in a graphite mold, machined with desired shape, having one optical fiber tube held at one side and a stainless steel tube held at the opposite side. One end of the fiber sensor is passing through the stainless steel tube and the other end is passing through the optical fiber tube. It is believed that the tubes reduce the stress discontinuity at the air-metal interface, allowing the fibers to withstand aluminum casting. Then molten aluminum is poured into the mold. However, Lee's method only works for metals having low melting temperatures. Embedding a fiber optic sensor in a metal structure having high melting temperature will decay the fiber, thus damage the sensor.

Another article entitled "Sensing Applications of Fiber Fabry Perot Interferometers Embedded in Composites and in Metals" by Taylor and Lee, issued in Experiments in Smart Materials and Structures, ASME, AMD-Vol. 181, pp. 47–52 (1993) has disclosed a Fiber Fabry Perot Interferometer (FFPI) as a strong candidate for embedding in a composite or metal part to measure properties of this structure using the method described in the above prior art, "Method for Embedding Optical Fibers and Optical Fiber Sensors in Metal Parts and Structures" However, the composite layer doesn't bond with nonmetal coating layers of the FFPI thus the FFPI slips during the measurement.

Furthermore, for metals with higher melting temperatures, for example, stainless steel, nickel, iron, or titanium, all of which have melting temperatures above 1400° C., no solution has been disclosed.

There is a need, therefore, for an embedded fiber optic sensor and a method for embedding a fiber optic sensor in a high melting temperature metal structure, in which the resulting embedded sensor adheres strongly to the metal in which it is embedded.

OBJECTS AND ADVANTAGES

Accordingly, it is a primary object of the invention to provide a remote fiber optic sensing system for measuring temperature and strain in a rotating metal structure. The system is a non-contact measurement system, in which measurement information is transferred from the structure to a detector through an aligned light beam, which enters the structure at its rotational axis.

It is an additional object of the invention to provide a remote fiber optic sensing system for measuring temperature and strain in a high melting temperature metal. An advantage of this system over standard measurement systems is that it can be used in hostile environments, in which the sensing area is difficult to reach, and in cases in which electrical signal transmission from the sensing area is not feasible.

It is another object of the present invention to provide embedded fiber optic and thin film thermo-mechanical sensors for measuring temperature, strain, or other properties in high melting temperature metal structures. The embedded sensors have greater accuracy and sensitivity than conventional strain gauges and thermocouples.

It is a further object of the present invention to provide a method for embedding fiber optic and thin film thermo-mechanical sensors in high melting temperature metal structures. The present method combines low temperature coating processes with high temperature embedding processes to create an overall process that does not damage the sensor.

SUMMARY

These objects and advantages are attained by an embedded fiber optic or thin film thermo-mechanical sensor, a method for producing the embedded sensor, and an embedded fiber optic sensing system. A fiber optic sensor or a thin film thermo-mechanical sensor is embedded in a metal having a melting temperature above 660° C., and the metal is uniformly and closely bonded with the outer surface of the sensor. The embedded sensor can be used to measure temperature and strain in the metal.

A first embodiment of the present invention describes a method for embedding a sensor in a metal structure having a melting temperature above 660° C. A first thin metallic layer is sputter-deposited onto the sensor. This first thin metallic layer forms a conducting surface for the deposition of the next layer. A second thin metallic layer is electroplated onto the first metallic layer, and a metal structure, for which measurements are obtained by the sensor, is laser deposited on the second thin metallic layer.

The method described in the first embodiment is applied for producing an embedded fiber optic sensor according to a second embodiment of the present invention. An embedded fiber optic sensor includes a fiber optic sensor and a metal structure. The metal structure includes a coating layer around the sensor and a bulk metal, for which measurements are obtained, around the coating layer. Most preferably, the coating layer includes a first thin metallic layer and a second thin metallic layer around the first thin metallic layer. The first metallic layer is formed by magnetron sputtering and typically has a thickness of between about 1 μm and about 3 μm. The second metallic layer is formed by electroplating on the first metallic layer and typically has a thickness of between about 0.25 mm and about 2 mm. Both layers can be composed of any suitable metal, for example, nickel, iron, or platinum, and do not need to be of the same metal. The bulk metal is formed around the second metallic layer with a high-temperature process, which is preferably a laser deposition such as laser cladding, casting and welding, whereby the sensor is embedded in the metal structure.

The method described in the first embodiment is also applied for producing an embedded thin film thermo-mechanical sensor according to a third embodiment of the present invention. The embedded thin film thermo-mechanical sensor has similar structure with the embedded fiber optic sensor as described in the above second embodiment, which includes a thin film thermo-mechanical sensor and a metal structure. Thin film thermo-mechanical sensors consist of two insulating layers sandwiching a sensor layer. The metal structure includes a coating layer coating the sensor and a bulk metal, for which measurements are obtained, around the coating layer. The coating layer includes a first thin metallic layer covering the thin film sensor and a second metallic layer on the first metallic layer. The first thin metallic layer is formed by sputtering, and the second metallic layer is formed by the electroplating. Thin film thermo-mechanical sensors are sputter-deposited and shaped via photolithography. An adhesive layer of Ti is sputter-deposited on a substrate of stainless steel. A first insulating is sputtered on the adhesive layer, which provides the sensors with adequate electrical insulation from the stainless steel substrate. Sensor films are sputter-deposited on the first insulating layer, and shaped with micromachining combining photolithography and a lift-off. A second insulating layer is sputtered on the sensor films. The coating layer protects the thin film structure from the high-temperature embedding process. A first thin metallic layer is formed by sputtering on the top dielectric film serving as a seed for the electroplating of a second thicker metallic layer. The whole structure is embedded in the bulk metal with a high-temperature process, which preferably is laser deposition such as laser cladding, casting and welding.

The first metallic layer is preferably made of copper since copper is a good candidate for minimizing temperature gradients so that the thin film sensor layer will undergo less localized thermal stress. The second metallic layer formed by electroplating includes two metallic sublayers. The first sublayer contacting the first metallic layer is made of copper about 1 mm thick to make the temperatures more inform in the sensor layer and protect the thin film sensor. However, copper will not form good bonding with later laser deposited bulk metal. To facilitate the embedding process, a second sublayer is made of nickel with a thickness of between about 1 mm and about 2 mm to form a good bonding with laser deposited layer.

The embedded fiber optic sensor described in the second embodiment may be incorporated in a remote embedded fiber optic sensing system to measure properties, such as temperature and strain, in a metal structure having a melting temperature above 660° C. according to a fourth embodiment of the present invention. The system contains a first fiber optic sensor embedded in the metal structure, a first and a second embedded optical fiber leads, with a first end connected to the fiber optic sensor and a second end at an external surface of the metal structure, and an optical system. The optical system has a light source for generating a light beam and a first light aligning means for directing the light beam into the second end of the first embedded optical fiber lead. An output signal from the sensor exits the second embedded optical fiber lead and is directed by a second light aligning means to a photo-detector. A PC data acquisition system collects the output voltage from the light source and the photo-detector for processing the output signals to obtain temperature, strain, or other information.

In an alternate embodiment, a fiber embedded in the metal structure may include multiplicity of sensors having different wavelengths, therefore different output signals are obtained. All of the sensors are connected to the same embedded optical fiber lead to form a multiplexed sensing system. Any number of sensors can be multiplexed. In another alternative embodiment, one or more fibers can be embedded in a metal structure at different sites, therefore properties at different locations of the metal structure are measured.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The present invention provides an embedded sensor for measuring properties, for example, temperature and strain, of a high melting temperature structure. The embedded sensor is closely and uniformly bonded to the surrounding metal structure for maximum accuracy. Any suitable sensor type can be used, for example, a thin film thermo-mechanical sensor or a fiber optic sensor such as a fiber grating sensor or Fabry-Perot sensor.

A method for embedding a sensor in a metal structure having a melting temperature above 660° C. is also provided to measure the temperature and/or strain of this metal structure according to a first embodiment of the present invention. Using a combination of low temperature coating processes and high temperature embedding processes, the sensor is embedded in the metal without being damaged or suffering a reduction in performance. The low temperature processes include the steps of magnetron sputtering of a first thin metallic layer on the sensor, and electroplating a second thin metallic layer on the first thin metallic layer. The high temperature processes include the step of laser deposition to form a metal structure having properties measured by the sensor.

Figure 1:
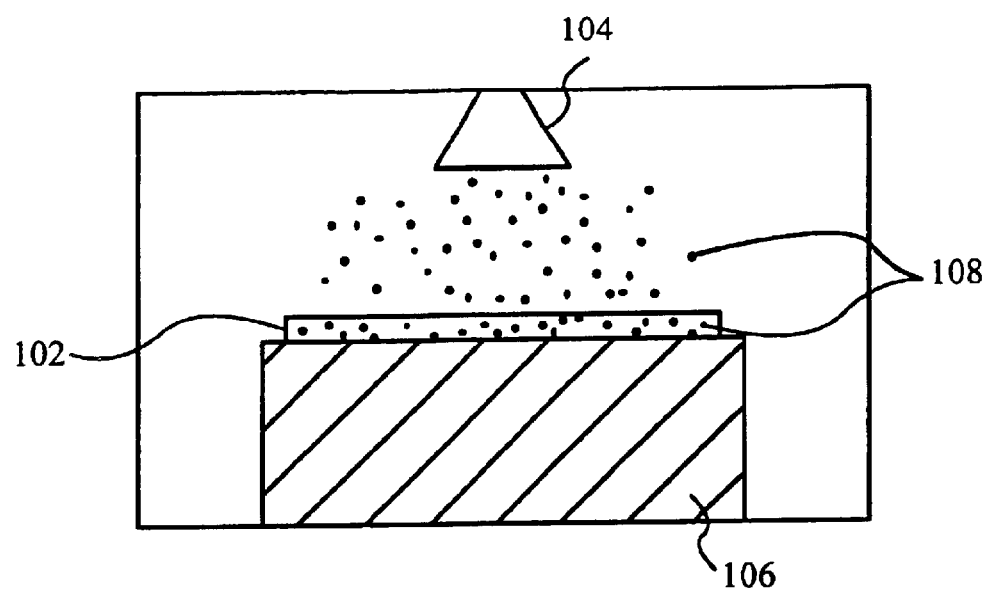
FIG. 1 is a schematic diagram of a sputtering system used by the method according to the first embodiment of the present invention.
Figure 2:
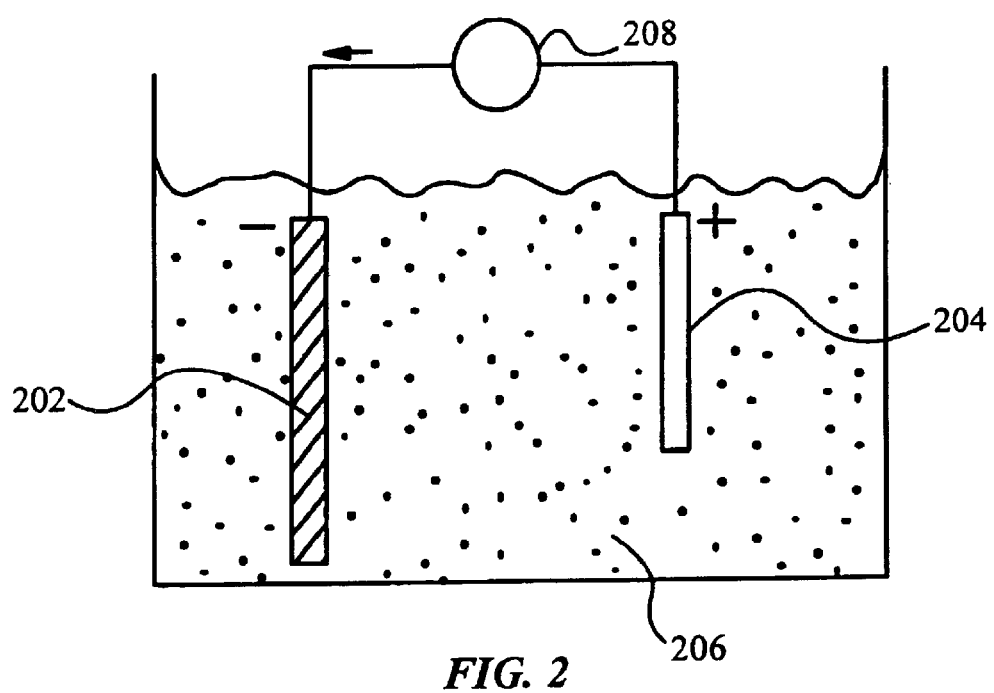
FIG. 2 is a schematic of an electroplating system used by the method of the present invention.

FIG. 1 is a schematic diagram illustrating a first step of the low temperature processes. Sensor 102 is supported on a sputtering support 106. A sputtering tool 104 produces metal atoms 108 that coat sensor 102. Sputtering support 106 can include a metal substrate, which becomes part of the metal structure formed in a subsequent step. Sensor 102 is placed inside a V-groove in the substrate. Metal atoms 108 form a first thin metallic layer on sensor 102. The thin metallic layer adheres well to sensor 102, and there are no significant gaps between the first thin metallic layer and sensor 102. The thickness of the first metallic layer is preferably between about 1 $\mu$m and 3 $\mu$m. Metal atoms 108 can be copper, nickel, iron, platinum, or any other metal that adheres to sensor 102 and is suitable for the following step. The first thin metallic layer provides a conducting surface for electroplating the second thin metallic layer as shown in FIG. 2. The first thin metallic layer may alternatively be produced by any standard thin film forming technique, including Physical Vapor Deposition or Chemical Vapor Deposition techniques.

A second step of the low temperature processes is shown schematically in FIG. 2. A second thin metallic layer, preferably between about 0.25 mm and about 2 mm thick, is electroplated onto the first thin metallic layer. An electrode 204 and a sensor with first thin metallic layer 202 are immersed in a metal electrolyte solution 206. A voltage source 208 is connected between the sensor with first thin metallic layer 202, the cathode, and electrode 204, the anode. The voltage between the sensor 202 and the electrode 204 directs the ions toward the sensor 202. Metal electrolyte solution 208 contains ions of copper, nickel, iron, platinum, or any other metal that make a good bonding with later embedding metallic layer. Thus a second thin metallic layer is plated onto the sensor 202. The two thin metallic layers can be formed from the same or different-metals.

In essence, the two metallic layers form a single layer having a thickness of between about 0.25 mm and about 2 mm. The two steps provide a convenient method for forming such a layer. Sputtering alone is not a feasible technique for producing a layer of such thickness, and electroplating requires a conducting surface, in this case provided by the sputtered layer.

In the third step of the process, an embedding metallic layer or a metal structure is formed on the second thin metallic layer, whereby the sensor is embedded in this metal structure. The embedded sensor measures properties of this metal structure, such as temperature or strain. The metal structure may be made of a metal having a melting temperature well above 660° C., for example, stainless steel, nickel, iron, or titanium, which all have melting temperatures above 1400° C. The technique for forming the metal structure is the same as is used to form the structure without an embedded sensor. These techniques include, but are not limited to, laser cladding, casting, and welding.

The first and second metallic layers, formed by low temperature processes, protect the sensor from the subsequent high-temperature process for forming the metal structure. If the metal structure were formed directly around the sensor, the thermal shock would cause the sensor to crack. The first and second thin metallic layers reach the same temperature as the metal structure upon contact with the molten metal, but the balanced heat load allows the sensor to expand uniformly without cracking in response to the dramatic thermal stresses.

Figure 3:
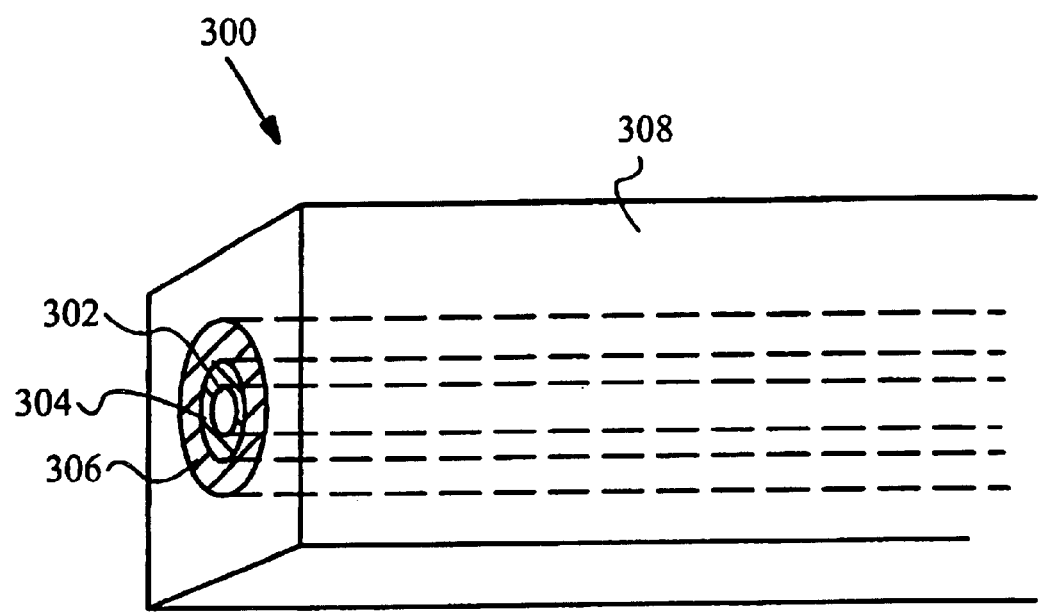
FIG. 3 is a perspective view of the embedded fiber optic sensor according to a second embodiment of the present invention.

The method described above is used for embedding a fiber optic sensor in a metal structure. FIG. 3 illustrates a perspective view of an embedded fiber optic sensor 300 according to a second embodiment of the present invention. The embedded fiber optic sensor 300 includes a fiber optic sensor element 302, a first thin metallic layer 304 formed by a sputtering step, a second thin metallic layer 306 formed by an electroplating step, and a metal structure 308 formed by a laser depositing step. Furthermore, the fiber optic sensor 302 is coated by an adhesive layer of Titanium about 1 micron thick before the sputtering of the first metallic layer 304. Typically, the diameter of sensor 302 surrounded by first thin metallic layer 304 and second thin metallic layer 306 is between about 0.3 mm and about 2 mm, and so does not affect the structure or temperature profile of metal structure 308, for which measurements are required. Fiber optic sensor element 302 may be fiber Bragg gratings or Fabry-Perot fiber sensors.

Figure 4A:
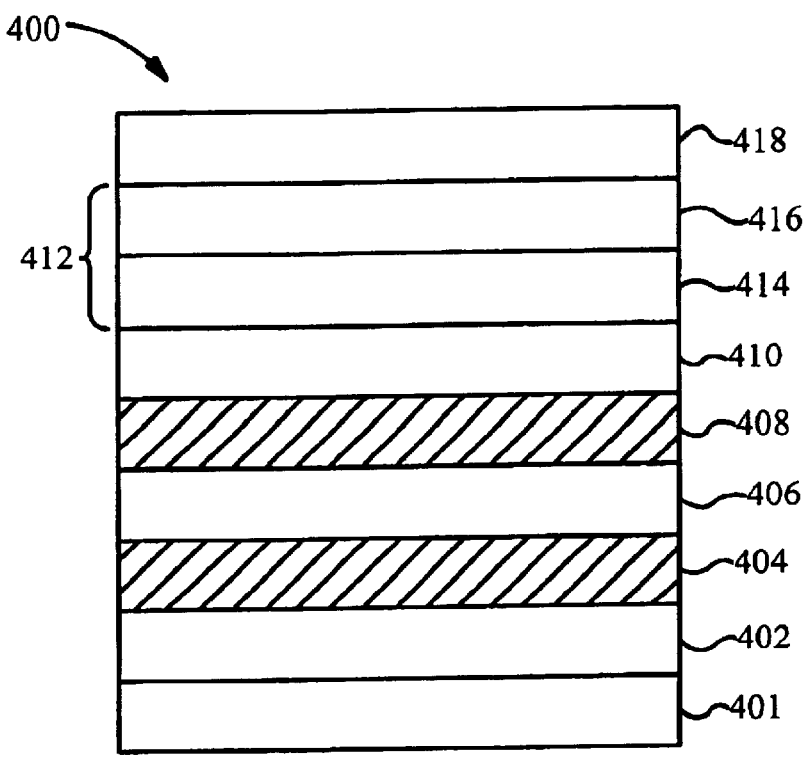
FIG. 4A is a cross-sectional schematic diagram of the embedded thin film thermo-mechanical sensor according to a third embodiment of the present invention.

The above method also can be used for embedding a thin film thermo-mechanical sensor. FIG. 4A shows a cross-sectional schematic diagram of an embedded thin film thermo-mechanical sensor 400 according to a third embodiment of the present invention. The embedded thin film sensor 400 is formed by sputter-depositing an adhesive layer of titanium between about 1 mm and about 2 mm thick 402 on a substrate of stainless steel 3 mm thick 401. A first insulating layer of between about 10 nm and about 15 nm thick 404 is reactively sputtered on the adhesive layer 402. The insulating layer 404 provides the sensor with adequate electrical insulation from the substrate 401. Sensor film 406 is sputtered-deposited and shaped via photolithography on the insulating layer 404. The materials used for the sensor film 406 are selected with respect to their thermo-electric properties. The standard thermocouple alloys and metals, such as alumel, chromel, constanan and copper, may be used to build the sensor film 406. A second insulating layer of between about 10 nm and about 15 nm 408 is sputtered on the sensor layer 406 to partly cover the sensor. The first and second insulating layers are preferably made of the same material. Aluminum oxide is chosen as the preferred material for the insulating layers 404 and 408 based on its thermal expansion coefficient compatibility and target cost.

A first thin metallic layer 410 is sputtered on the insulating layer 408 and a second thin metallic layer 412 is electroplated on the first insulating layer 410. The purpose of these layers 410 and 412 is to protect the thin film structure, including insulating layers 404 and 408 and the sensor layer 406, from the high-temperature embedding process. These layers are necessary to reduce the temperature effect experienced by the thin films as an intense and localized heat flux imparted by the laser during the formation of the embedding layer 418. Copper is a preferred material for layer 410 that minimize temperature gradients so that the thin film sensor layer 406 will undergo less localized thermal stress. However, copper will not form good bonding with later laser deposited metal layer. Therefore, the second metallic layer 412 preferably includes two sublayers 414 and 416. The sublayer 414 contacted to the first metallic layer 410 is preferably made of copper to make the temperature more uniform in the sensor layer 406. The subslayer 416 is preferably made of nickel, which makes good bonding with later laser deposited layer, to success the embedding process.

Figure 4B:
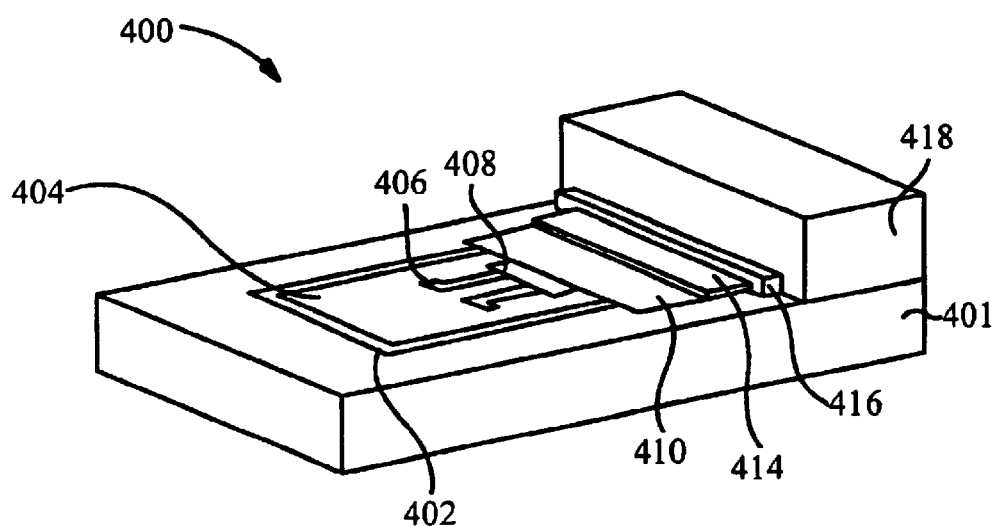
FIG. 4B is a perspective view of the embedded thin film thermo-mechanical sensor depicted in FIG. 4A.

The embedding metal layer 418 is deposited on the second thin metallic layer 412 by laser casting, cladding or welding. A perspective view of the embedded thin film thermo-mechanical sensor 400 is shown in FIG. 4B.

Figure 5:
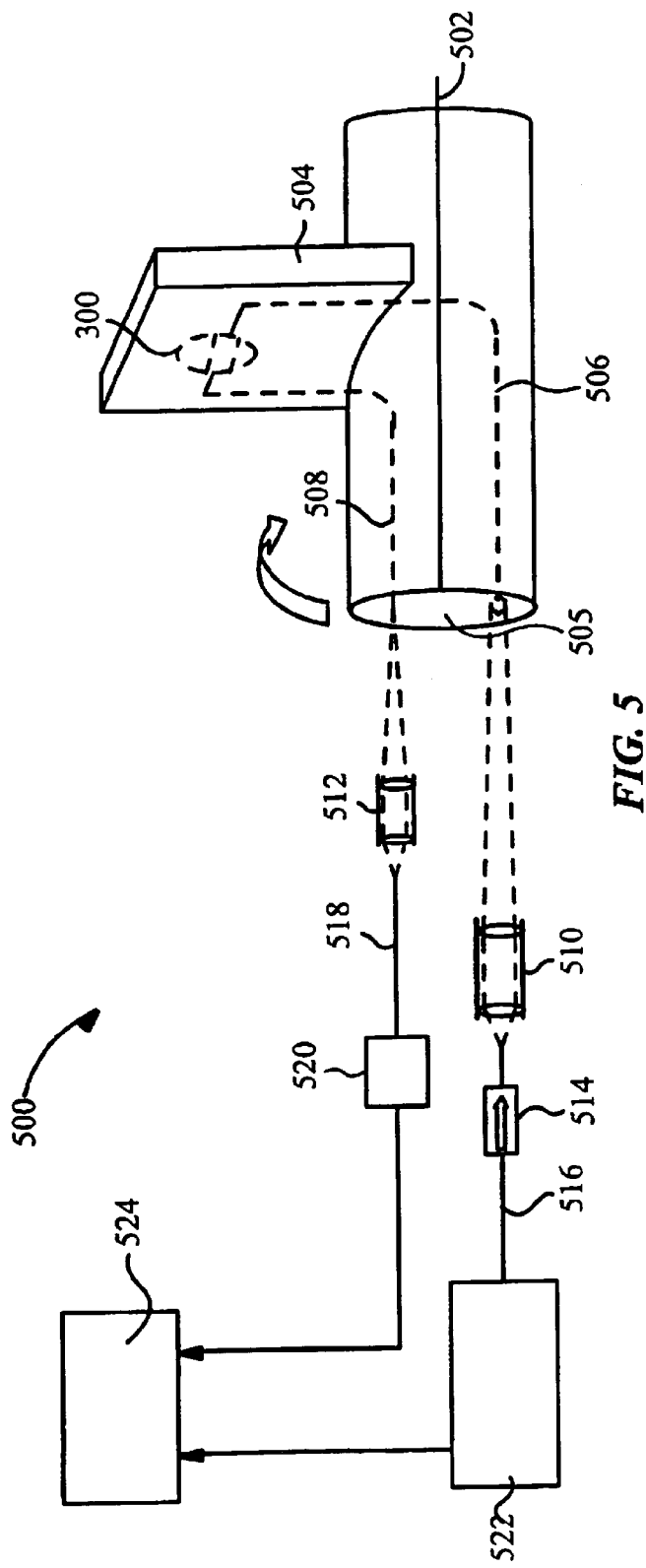
FIG. 5 is a schematic diagram of a remote non-contact sensing system according to a fourth embodiment of the present invention.

The embedded fiber optic sensor depicted in FIG. 3 is incorporated in a remote non-contact sensing system for measuring properties, such as temperature and strain, in structures, specially for a rotating metal structure, such as a turbine blade. FIG. 5 is a schematic view of the remote embedded fiber optic non-contact sensing system 500 according to a fourth embodiment of the present invention. The system of FIG. 5 measures properties, such as temperature and strain, in a rotating metal structure 504. A sensor 300 is embedded in a rotating metal structure 504. A light source 522 providing light beam couples to the sensor 300 through a first embedded optical fiber lead 506 with the first end of the lead 506 connected with the sensor 300 and the second end adjacent to an external surface 505 of structure 504 substantially parallel to the rotational axis 502 of structure 504. Depending on the types of sensor 300, light source 522 can be any low coherence, broadband spectral source, or tunable light source, for example, a wavelength tunable laser, a laser-emitting diode (LED) or multi-mode laser diode. A first aligning means 510, such as an aligning lens, directs the light beam from the light source 522 to the first embedded optical lead 506. An optical isolator 514 between the aligning means 510 and the light source 522 prevents the reflected light beam reflected from the sensor 300 from reaching the light source 522, which prevents the damaging of the light source 522.

A photo-detector 520 collecting output signals modulated by the material properties of the structure 504, couples to the sensor 300 through the second embedded optical fiber lead 508 having a first end connected to the sensor 300 and a second end adjacent to an external surface 505 of structure 504 substantially parallel to the rotational axis 502 of structure 504. The second aligning means 512 directs the output signals from the sensor 300 to the photo-detector 520.

The length of fiber leads 506 and 508 depend on the design of structure 504. They must be long enough to reach from sensor 300 to the external surface 505 of structure 504. Because the fiber leads 506 and 508 are positioned parallel to the rotational axis 505, the relative position of the fiber 506 and 508 and the aligning means 510 and 512 respectively are fixed, even as the structure 504 rotates at very high speeds. Furthermore, Erbium-doped fibers 516 and 518 may be used to amplify the optical signals if light loss is a concern due to small size of optical fibers.

A data acquisition system 524 connected to the light source 522 and the photo-detector 520 collects the voltage output data from the photo-detector 520 and the voltage output form the light source 522, which are measured after each rotation of the structure 504. By knowing the voltage outputs as functions of time from the light source 522 and the photo-detector 520, the wavelength versus time can be determined. The sensor 300 reflects material properties, such as temperature or strain, of the structure 504 in only one single wavelength, thus all other lights with different wavelength will go through to the photo-detector 520. Thus, at that single wavelength, the received light intensity will drop to almost zero. In this way, a wavelength corresponding to the sensor 300 response of the material property can be determined. Therefore, the material properties of the structure 504 are determined.

Figure 6:
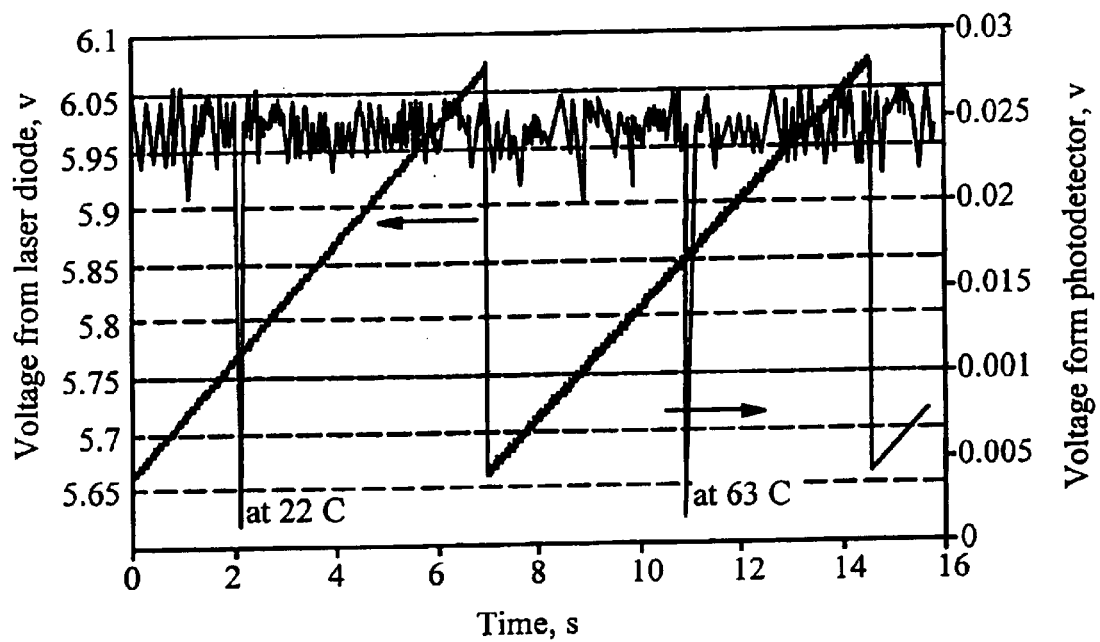
FIG. 6 is a graph depicting the waveform of the voltages from the light source and the photo-detector for the sensing system depicted in FIG. 5 with a Fiber Bragg Grating sensor embedded in a metallic structure.

FIG. 6 shows a typical waveform of the voltages from the light source and the photo-detector for the remote sensing system 500 with a fiber Bragg grating sensor embedded in the rotating metal structure 504. The laser wavelength is given in term of its output voltage, $\lambda(nm)=27.616 \times V_{laser\ diode}+1387.1$. The wavelength tuning range in the experiment is set between 1545 nm and between 1555 nm. At room temperature, about 22° C., the wavelength is found to be 1548.1 nm (5.83 volts as $V_{laser\ diode}$), which is obviously shifted from 1550 nm due to the residual stress after the laser deposition. When temperature rises to about 60° C., the wavelength shifts to 1549.3 nm (5.873 volts as $V_{laser\ diode}$).

In an alternative embodiment, an optical fiber embedded in the metal structure may include multiple sensors having different wavelengths, therefore different output signals are obtained. All of the sensors are connected to the same embedded optical fiber lead to form a multiplexed sensing system. Any number of sensors can be multiplexed. In another alternative embodiment, one or more fibers can be embedded in a metal structure at different sites, and couple with the light source and the photo-detector through different embedded optical fiber leads, therefore properties at different locations of the metal structure are measured.

It will be clear to one skilled in the art that the above embodiment may be altered in many ways without departing from the scope of the invention. For example, the first thin metallic layer can be formed by other techniques such as evaporation. Accordingly, the scope of the invention should be determined by the following claims and their legal equivalents.

What is claimed is:

1. A remote non-contact sensing system to monitor the properties of a structure, the system comprising:
    a first metal embedded fiber optic sensor embedded in the structure, wherein the first metal embedded fiber optic sensor comprises:
        a fiber optic sensor element;
        a first metallic layer deposited circumferentially on the fiber optic sensor element;
        a second metallic layer deposited circumferentially on the first metallic layer; and
        an embedding metallic layer in contact with and circumferentially surrounding the second metallic layer;
    a light source coupling to the first metal embedded fiber optic sensor;
    a photo-detector coupling to the first metal embedded fiber optic sensor; and
    a first optical fiber lead optically coupled to the first metal embedded fiber optic sensor and optically coupled to the light source:
    wherein the first optical fiber lead comprises a first end connected to the first metal embedded fiber optic sensor and a second end adjacent to an external surface of the structure.

2. The sensing system of claim 1, wherein the first metallic layer is formed by sputtering.

3. The sensing system of claim 2, wherein the second metallic layer is formed by electroplating.

4. The sensing system of claim 3, wherein the embedding metallic layer is formed by laser deposition.

5. The sensing system of claim 3, wherein the embedding metallic layer is formed by casting.

6. The sensing system of claim 3, wherein the embedding metallic layer is formed by welding.

7. The sensing system of claim 1, wherein the light source comprises a wavelength tunable laser.

8. The sensing system of claim 7, wherein the tunable laser produces light having discrete wavelengths.

9. The sensing system of claim 1, wherein the light source comprises a broad band laser diode.

10. The sensing system of claim 9, wherein the broad band laser diode emits light with a broad spectrum.

11. The sensing system of claim 1, further comprising a first aligning means for directing a light beam from the light source to the first end of the first optical fiber lead.

12. The sensing system of claim 11, wherein the first aligning means comprises an aligning lens.

13. The sensing system of claim 1, further comprising an isolator between the first aligning means and the light source to isolate the source from light reflected from the first metal embedded fiber optic sensor.

14. The sensing system of claim 13, further comprising a first Erbium-doped fiber (EDF) between the light source and the isolator to amplify optical signals.

15. The sensing system of claim 14, further comprising a second optical fiber lead optically coupled to the first metal embedded fiber optic sensor and optically coupled to the photo-detector.

16. The sensing system of claim 15, wherein the first optical fiber lead comprises a first end connected to the first metal embedded fiber optic sensor and a second end adjacent to an external surface of the structure.

17. The sensing system of claim 16, further comprising a second aligning means for directing an output signal, modulated by a material property of the structure, from the first metal embedded fiber optic sensor to the photo-detector.

18. The sensing system of claim 17, wherein the second aligning means comprises an aligning lens.

19. The sensing system of claim 18, further comprising a second Erbium-doped fiber between the second aligning means and the photo-detector to amplify optical signals.

20. The sensing system of claim 1, further comprising a data acquisition system connected to the photo-detector and the light source.

21. The sensing system of claim 1, further comprising a second metal embedded fiber optic sensor embedded in a different location in the structure.

22. The sensing system of claim 1, wherein the first metal embedded fiber optic sensor comprises one or more fiber optic sensor elements.

23. The sensing system of claim 1, wherein the structure is rotatable about a rotational axis.

24. The sensing system of claim 23, wherein an optical fiber lead is positioned substantially along the rotational axis and is optically coupled to the first metal embedded fiber optic sensor.

25. A remote non-contact sensing system to monitor the properties of a structure, the system comprising:
    a first metal embedded fiber optic sensor embedded in the structure, wherein the first metal embedded fiber optic sensor comprises:
        a fiber optic sensor element;
        a first metallic layer deposited circumferentially on the fiber optic sensor element;
        a second metallic layer deposited circumferentially on the first metallic layer; and
        an embedding metallic layer in contact with and circumferentially surrounding the second metallic layer;
    a light source coupling to the first metal embedded fiber optic sensor;
    a photo-detector coupling to the first metal embedded fiber optic sensor;
    a first optical fiber lead optically coupled to the first metal embedded fiber optic sensor and optically coupled to the light source; and
    a second optical fiber lead optically coupled to the first metal embedded fiber optic sensor and optically coupled to the photo-detector;
    wherein the second optical fiber lead comprises a first end connected to the first metal embedded fiber optic sensor and a second end adjacent to an external surface of the structure.

26. A remote non-contact sensing system to monitor the properties of a structure, the system comprising:
    a first metal embedded fiber optic sensor embedded in the structure, wherein the first metal embedded fiber optic sensor comprises:
        a fiber optic sensor element;
        a first metallic layer deposited circumferentially on the fiber optic sensor element;

a second metallic layer deposited circumferentially on the first metallic layer; and an embedding metallic layer in contact with and circumferentially surrounding the second metallic layer;

a light source coupling to the first metal embedded fiber optic sensor;

a photo-detector coupling to the first metal embedded fiber optic sensor; and a optical fiber lead optically coupled to the first metal embedded fiber optic sensor and optically coupled to the photo-detector;

wherein the optical fiber lead comprises a first end connected to the first metal embedded fiber optic sensor and a second end adjacent to an external surface of the structure.

* * * * *